United States Patent [19]
Hummel et al.

[11] Patent Number: 6,079,536
[45] Date of Patent: Jun. 27, 2000

[54] ROTATIONAL SPEED CONTROL ARRANGEMENT FOR A FLUID FRICTION COUPLING

[75] Inventors: Werner Hummel, Affalterbach; Uwe Maier, Stuttgart; Horst Singer, Tamm; Gerold Schultheiss, Pforzheim, all of Germany

[73] Assignees: Behr GmbH & Co., Stuttgart; GKR Gesellschaft fuer Fahrzeugklima-regelung mbH, Schwieberdingen, both of Germany

[21] Appl. No.: 09/038,912

[22] Filed: Mar. 12, 1998

[30] Foreign Application Priority Data

Mar. 13, 1997 [DE] Germany .............. 197 10 384

[51] Int. Cl.⁷ .............. F16D 48/00; F16D 35/00
[52] U.S. Cl. .......... 192/58.62; 192/82 T; 192/103 R
[58] Field of Search ............. 192/58.62, 103 R, 192/103 F, 82 T

[56] References Cited

U.S. PATENT DOCUMENTS

| | | | |
|---|---|---|---|
| 4,228,880 | 10/1980 | Gee ................................. | 192/82 T X |
| 4,650,045 | 3/1987 | Weible et al. .................. | 192/82 T X |
| 4,828,088 | 5/1989 | Mohan et al. . | |
| 4,846,325 | 7/1989 | Mohan . | |
| 4,874,072 | 10/1989 | Mohan et al. .................. | 192/82 T X |
| 5,025,906 | 6/1991 | O'Neil et al. .................. | 192/82 T X |
| 5,030,865 | 7/1991 | Rockey et al. ................ | 192/58.62 X |
| 5,584,371 | 12/1996 | Kelledes et al. . | |
| 5,799,765 | 9/1998 | Ono et al. ........................ | 192/58.62 |

FOREIGN PATENT DOCUMENTS

| | | |
|---|---|---|
| 0 009 415 | 6/1982 | European Pat. Off. . |
| 0 550 413 | 7/1993 | European Pat. Off. . |
| 33 33 268 | 4/1985 | Germany . |
| 89 08 357 | 12/1989 | Germany . |
| 41 28 791 | 3/1992 | Germany . |
| 44 41 808 | 5/1996 | Germany . |

OTHER PUBLICATIONS

*Patent Abstracts of Japan*, 4–258531 A, M–1358, vol. 17, No. 38 (Jan. 25, 1993).

*Patent Abstracts of Japan*, 4–258529 A, M–1358, vol. 17, No. 38 (Jan. 25, 1993).

Hans Martin, "Electronically Controlled Electromagnetic VISCO® Fan Clutches for Commercial Vehicles", *ATZ Automobiltechnische Zeitschrift*, vol. 5, NO. 93 (1995).

*Primary Examiner*—Rodney H. Bonck
*Attorney, Agent, or Firm*—Evenson, McKeown, Edwards & Lenahan, PLLC

[57] ABSTRACT

An arrangement for controlling the rotational speed of an output rotational part of a fluid friction coupling is provided. A fan for cooling components of a motor vehicle is coupled with a driving rotational part by way of a shearing fluid whose effective fluid quantity determines the transferrable torque. The arrangement contains an adjusting unit (which can be electrically driven in a timed manner) for the variable adjustment of the effective shearing fluid quantity and contains a temperature controller stage to which the temperature of at least one medium whose temperature can be influenced by the output rotational speed is fed. The invention, the temperature controller stage is followed by a rotational speed controller stage to which, on the input side, the output signal of the temperature controller stage is fed as the dessired rotational output speed as well as the rotational driving speed and which, via of its output signal, drives the shearing fluid quantity adjusting unit of the coupling. The arrangement is usable for controlling the rotational speed of an engine fan in a motor vehicle.

24 Claims, 7 Drawing Sheets

ROTATIONAL SPEED CONTROL ARRANGEMENT FOR A FLUID FRICTION COUPLING

This application claims the priority of German application No. 197 10 384.7 filed in Germany on Mar. 13, 1997, the disclosure of which is expressly incorporated by reference herein.

BACKGROUND AND SUMMARY OF THE INVENTION

The invention relates to an arrangement for controlling the rotational speed of an output rotational part of a fluid friction coupling, particularly a fan for cooling components of a motor vehicle which is coupled with a driving rotational part by way of a shearing fluid whose effective fluid quantity determines the transferrable torque. Arrangements of this type are used, for example, for controlling the rotational speed of a fan for cooling motor vehicle components, such as engines. In this case, the fan is coupled to the vehicle engine by way of the fluid friction coupling.

A rotational speed control arrangement of the above mentioned type for such an engine fan is described in the Journal Essay "Electronically Controlled Electromagnetic VISCO® Fan Clutches for Commercial Vehicles" by H. Martin, *ATZ Automobiltechnische Zeitschrift*, 1995, Vol. 5, No. 93, p. 3. The fan is used for providing a cooling air flow for diverse engine-related media, such as an engine coolant, charge air, engine oil, transmission oil and retarder oil. The fan is also used, as required, for the refrigerant of an air-condition system. The fan can be switched between four fan stages. The rotational control arrangement uses the engine coolant temperature and the charge air temperature as constant control quantities. These two types of temperature information are fed to two parallel temperature control units. From the two controller output signals as well as a retarder output signal, the signal corresponding to the highest fan stage is selected by way of an output stage and is fed as a drive signal to a solenoid. Together with a valve actuated by it, the solenoid operates as an adjusting unit for the variable adjusting of the effective amount of shearing fluid. For this purpose, the coupling has a storage chamber and a working chamber which encloses the rotational driving part in the form of a driven coupling disk and between which one inflow and one return flow, respectively, is provided for a shearing fluid circulation. This is caused by a circulation pump pumping the shearing fluid from the working chamber into the storage chamber. The valve, which can be actuated by the solenoid, controls the shearing fluid circulation and thus the quantity of shearing fluid which is, in each case, situated in the working chamber that is available as the effective fluid quantity for the transmission of the torque.

Fluid friction couplings with a timed electric driving of an adjusting unit for the variable adjusting of the effective shearing fluid quantity are also disclosed in European Patent Document EP 0 009 415 B1 and German Patent Document DE 44 41 808 A1.

The invention is based on the technical problem of providing a rotational speed control arrangement of the above mentioned type, which has an improved control action improved in comparison to the above-mentioned conventional arrangements.

The present invention solves this problem by providing a rotational speed control arrangement having an adjusting unit which can be electrically driven in a timed manner for variably adjusting the effective shearing fluid quantity. A temperature controller stage receives temperature information of one or several media whose temperature can be influenced by the output rotational speed. A rotational speed controller stage, which is connected behind the temperature controller stage, is fed with the output signal of the temperature controller stage as the desired output rotational speed information, as well as the actual output rotational speed information and the driving rotational speed information. The output signal of the rotation speed controller stage drives the shearing fluid quantity adjusting unit.

In the case of this arrangement, the temperature controller stage is followed by a rotational speed control stage that receives the output signal of the temperature controller stage as a desired output rotational speed information. In addition, the actual output rotational speed information and the driving rotational speed information are supplied to the rotational speed control stage. From the input information, the rotational speed controller stage generates, as the output signal, the drive timing signal. This output signal is supplied to the adjusting unit for the variable adjustment of the effective shearing fluid quantity. Using this construction of the control arrangement with a rotational speed control circuit and a temperature control circuit superimposed on the latter, in order to achieve the respective desired tempering effects, the temperature-influencing rotational speed of the rotational output parts of the coupling can be set comparatively precisely, sensitively and reliably.

In another embodiment of the arrangement, a chopping of the rectangular pulses of the output signal of the rotational speed controller stage is provided that is a function of the supply voltage for the shearing fluid quantity adjusting unit. As a result, the effective value of the voltage acting upon the adjusting unit can be maintained at a constant value. This is also true in the case of a varying supply voltage. The effect here is that the adjusting unit does not have to be designed for high fluctuations of the effective voltage.

In yet another embodiment, an arrangement is used for controlling the rotational speed of a fan for a motor vehicle engine. The temperature controller stage is designed such that, by means of filed characteristic diagrams, it determines, from the actual values of the rotational engine speed and the rotational torque suitable engine-operation-dependent, desired temperature values for one or several engine-related media to be tempered (e.g. the engine coolant, the charge air and/or the engine oil).

In a further embodiment, an arrangement further developed according to the temperature controller stage is designed in a special manner such that, for each rotational-speed-relevant input quantity, it has one rotational-speed demand unit, respectively. The units are situated in parallel to one another. From the rotational-speed demand signals supplied by these units, utilizing a maximal-value selection stage, the signal with the highest rotational speed demand will then be selected for the transmission as the desired output rotational speed signal for the rotational speed controller stage.

In a still further embodiment of the arrangement, the rotational speed controller stage is designed for obtaining, by means of a suitably filed characteristic slip effect diagram, slip effect information representing the coupling temperature from the supplied information concerning the actual output rotational speed and the driving rotational speed. By means of this information, it is capable of preventing, using corresponding control interventions and/or by the emission of a corresponding warning signal, the occurrence of excessively high coupling temperatures damaging the shearing fluid.

In another embodiment of the arrangement, the rotational speed controller stage is designed such that it obtains the drive timing signal for the shearing fluid quantity adjusting unit as the sum of a basic adjusting signal and of a correction adjusting signal. In this case, it determines the basic adjusting signal by means of a filed basic characteristic diagram as the function of the supplied information concerning the driving rotational speed and the desired output rotational speed. The correction signal supplies corrections which result particularly from deviations of the respective coupling from the ideal coupling action represented by the basic characteristic diagram.

Other objects, advantages and novel features of the present invention will become apparent from the following detailed description of the invention when considered in conjunction with the accompanying drawings.

DETAILED DESCRIPTION OF THE DRAWINGS

Figure 1:
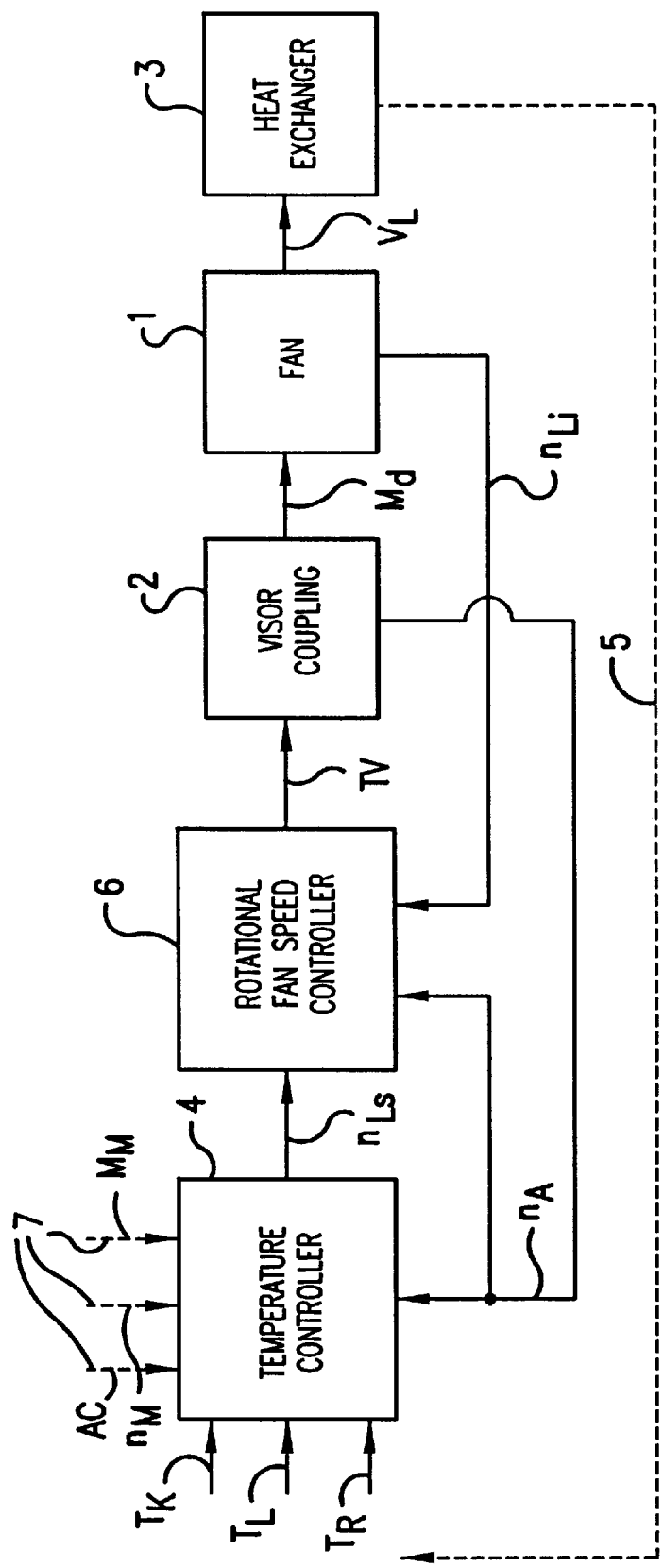
FIG. 1 is a block diagram of a rotational speed control arrangement for an engine fan coupled by way of a fluid friction coupling to a motor vehicle engine.

In the form of a block diagram, FIG. 1 illustrates an arrangement for controlling the rotational speed of an engine fan 1 of a motor vehicle engine which is coupled to the vehicle engine by way of a fluid friction coupling 2 of the type described in the above-mentioned journal essay by H. Martin. The fan is used for generating a cooling air flow whereby engine-related media can be cooled in heat transfer arrangements which follow and are represented in FIG. 1 by the heat transfer block 3. This block contains heat transfer units for the engine coolant, the charge air and the engine oil. In addition, the cooling air flow is used for cooling a, for example, six-stage retarder, and, as required, the refrigerant of a vehicle air-conditioning system.

The rotational speed control arrangement contains a rotational fan speed control circuit and a temperature control circuit superimposed on the latter. The temperature control circuit has a temperature controller 4 as the central unit. The temperature information sensed at the various heat transfer units 3 is fed to the input side of the temperature controller 4, as schematically indicated in FIG. 1 by way of a temperature signal line 5 indicated by a broken line. The temperature information supplied to the temperature controller 4, in particular, contains the temperature $T_R$ of the retarder, the charge air temperature $T_L$ and the engine coolant temperature $T_K$. Furthermore, various additional engine and vehicle information is supplied as input signals 7 to the temperature controller 4, which, among other information, comprises condition information AC concerning the air conditioner, the rotational engine speed $n_M$ and the engine torque $M_M$. Also, the temperature controller 4 receives as input information the rotational drive speed $n_A$, i.e., the momentary rotational speed of the coupling disk of the fluid friction coupling 2 that is driven by the engine.

As the central component of the subjacent rotational fan speed control circuit, a rotational fan speed controller 6 is connected behind the temperature controller 4. The output signal of the temperature controller 4 is supplied as the desired rotational fan speed $nL_s$ to the rotational fan speed controller 4. The rotational driving speed $n_A$ and the actual rotational fan speed $n_{Li}$ are supplied as additional input quantities to the rotational fan speed controller 6. On the output side, the rotational fan speed controller 6 emits a drive timing signal TV to the fluid friction coupling 2. Specifically, this drive timing signal TV is supplied to a solenoid mounted to the fluid friction coupling, which actuates a valve lever whereby the circulation of the shearing fluid and thus the shearing fluid quantity in the coupling effective for the torque transmission can be adjusted. The coupling torque $M_d$, which can be adjusted in this manner, will then drive the fan 1 in order to provide the respectively required cooling air flow $V_L$.

Figure 2:
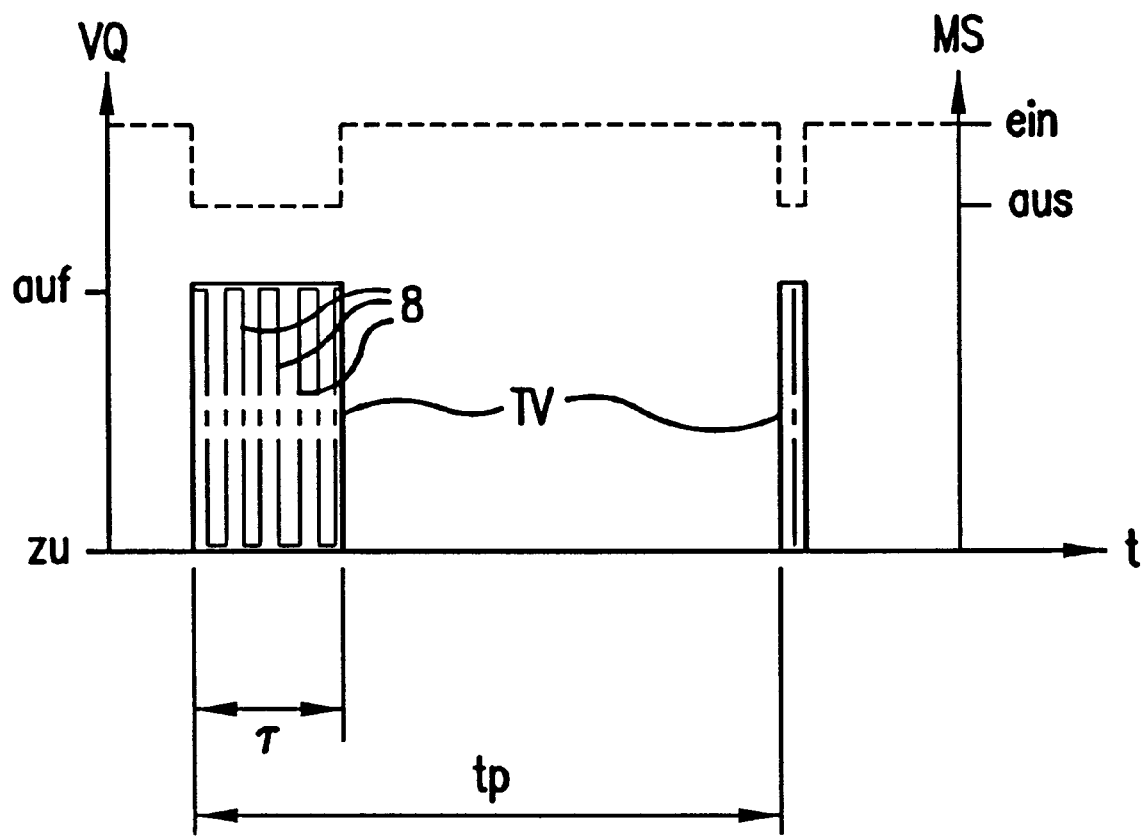
FIG. 2 is a diagram for illustrating the output signal emitted by a rotational speed controller stage in FIG. 1.

For driving the solenoid, which together with the valve actuated by it, operates as an adjusting unit for the variable adjusting of the effective shearing fluid quantity, the rotational fan speed controller 6 generates from the input information a rectangular-pulse drive timing signal TV. This is schematically illustrated in FIG. 2. The drive timing signal TV has a defined period $t_p$ with a variable pulses width repetition rate $\tau/t_p$ that determines the respective effective shearing fluid quantity. Typical period durations $t_p$ are in the range of, for example, 1s. In the ordinate direction, for illustrating the drive effect, on the one hand, the action upon the solenoid by means of a magnetic voltage MS controlled by the drive timing signal TV and, on the other hand, the valve opening cross-section VQ resulting from the corresponding valve operation are entered in FIG. 2. A disconnected or connected magnetic voltage MS, and correspondingly a fully opened or closed valve cross-section VQ, corresponds to the high or low signal level of the drive timing signal TV. In order to be able to use the solenoid control for different magnetic supply voltages (that is, different on-board vehicle voltages) without the danger of damaging the magnet or the valve connected behind it, pulse chopping devices (not shown) are provided through which the rectangular pulse of the drive timing signal TV pertaining to a respective connecting interval $\tau$ is chopped into a plurality of individual pulses 8. This is indicated by a dash-dotted line in FIG. 2. In this case, the chopper frequency is selected as a function of the respective magnetic supply voltage such that, independently of the latter, an effective voltage value (which remains constant), is obtained for the magnetic voltage MS which acts upon the magnetic coil. Known conventional arbitrary switching devices, for this purpose can be used as chopper devices. These may still be positioned within the rotational fan speed controller 6 or between it and the solenoid mounted in the coupling 2.

Figure 3:
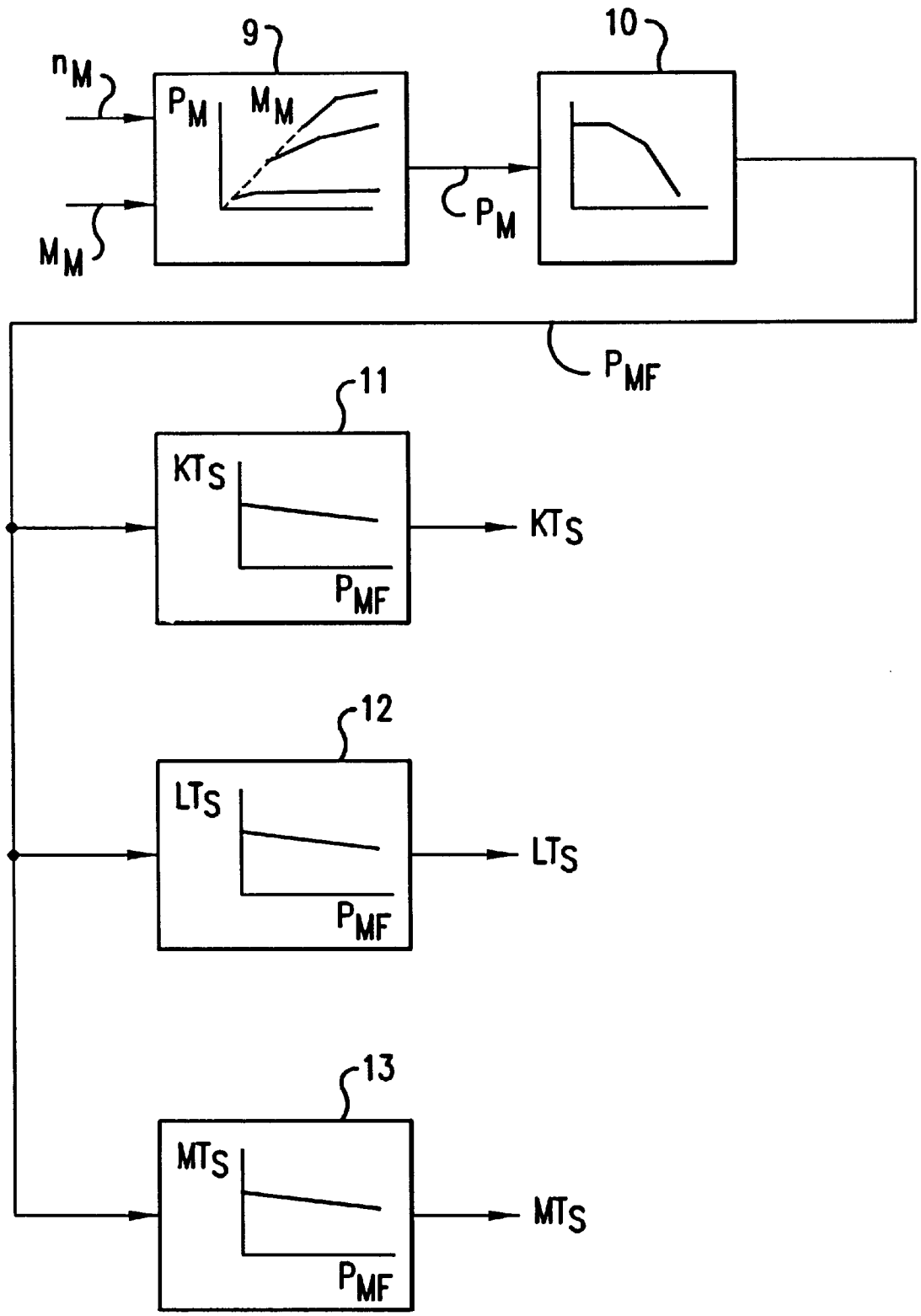
FIG. 3 is a block diagram of a controller part for generating the desired temperature of a temperature controller stage in FIG. 1.

The temperature controller 4 is preferably designed for generating desired-temperature values for the individual media to be tempered, which variably depend on the actual engine power. The controller part illustrated in FIG. 3 is used for this purpose. It contains a characteristic engine power diagram 9 in which the engine power $P_M$ is filed as a function of the measurable quantities, such as the, rotational engine speed $n_M$ and engine torque $M_M$. By means of the characteristic diagram 9, this controller part determines, from the supplied actual information of the rotational engine speed $n_M$ and the engine torque $M_m$, the momentary engine power $P_M$. Its time sequence is guided by way of a low-pass filter 10. In the thus filtered engine power quantity $P_{MF}$, short-term engine power fluctuations are suppressed. The filtered engine power quantity $P_{MF}$ will then be used for determining desired temperature courses by means of respective characteristics diagrams filed for this purpose. Particularly, utilizing a characteristic coolant curve stage 11, a desired coolant temperature $KT_s$ is determined; utilizing a characteristic charge air curve stage 12, a desired charge air temperature $LT_s$ is determined; and utilizing a characteristic engine oil stage 13, a desired engine oil temperature $MT_s$ is determined. Expediently, the characteristic coolant curve stage 11 is designed such that, when the engine power rises, the desired coolant temperature is lowered in order to be able to counter the rising requirement of heat removal in time by an increasing rotational fan speed.

Figure 4:
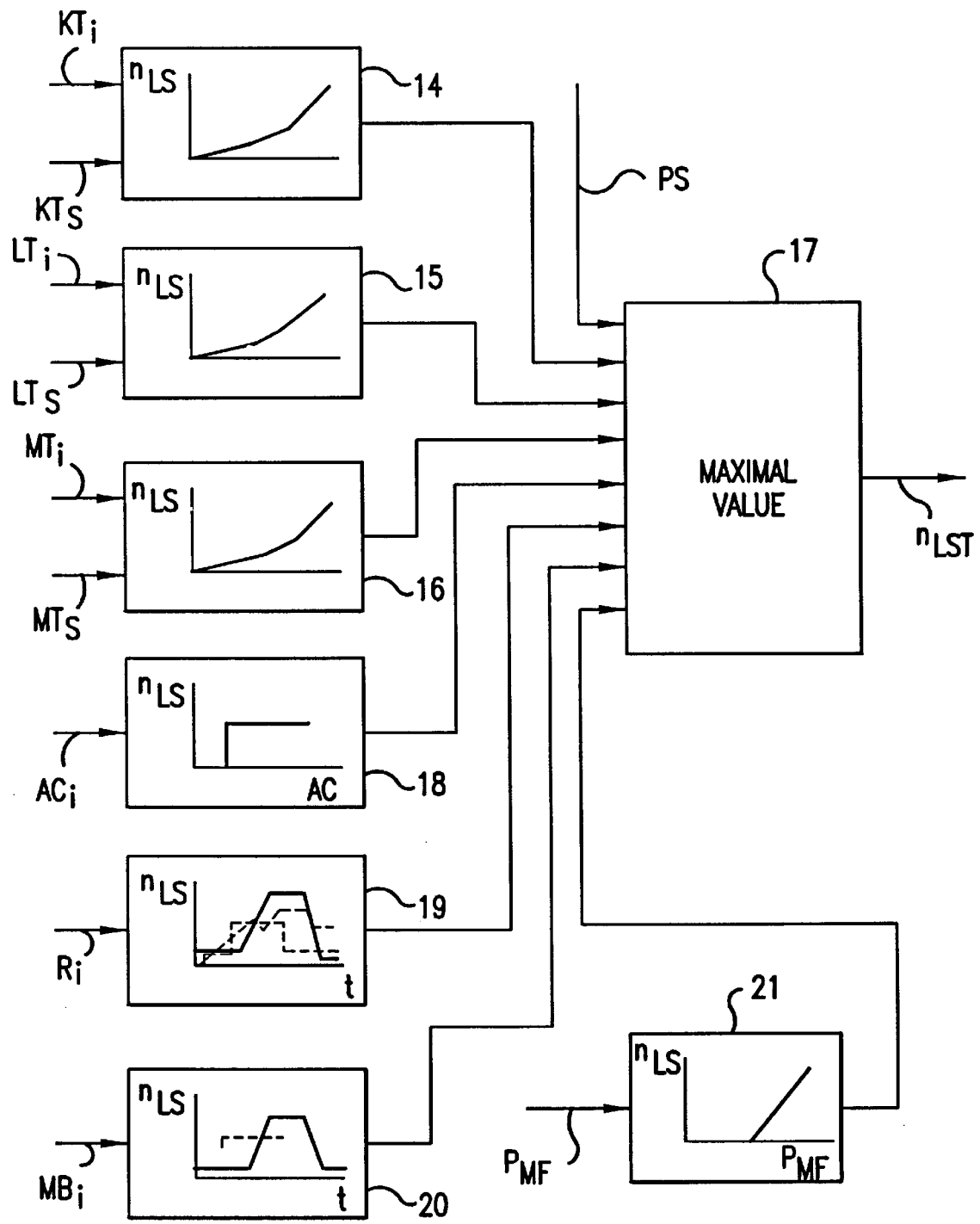
FIG. 4 is a block diagram of a controller part for generating the desired rotational speed of the temperature controller stage in FIG. 1.

Another part of the temperature controller 4 is used for generating the rotational fan speed demand as a function of the different desired/actual value temperature deviations and other vehicle operating conditions. This controller part is illustrated in FIG. 4. It contains three parallel PID controller units 14, 15, 16 to each of which, on the one hand, one of the desired values $KY_s$, $LT_s$, $MT_s$ respectively determined in the controller part of FIG. 3 with respect to the coolant temperature, the charge air temperature and the engine oil temperature is fed and, on the other hand, the respective pertaining actual temperature value $KT_i$, $LT_i$, $MT_i$ is fed. Each controller unit 14, 15, 16 emits a separate output signal as the rotational speed demand signal resulting from the respective control difference. The output signals are fed in parallel to a maximal value selection stage 17. Furthermore, in parallel to the three PID controller units 14, 15, 16, this controller part contains an air conditioning demand unit 18, a retarder demand unit 19 and an engine brake demand unit 20. Each of these demand units 18, 19, 20 also generates a separate rotational speed demand signal as a function of filed characteristic diagrams and of the respective actual condition information $AC_i$, $R_i$ and $MB_i$ of the momentary operating conditions of the air conditioner, the retarder and the engine brake.

Another rotational speed demand signal is emitted by an engine power demand unit 21 as a function of the filtered engine power quantity $P_{MF}$ determined in the controller part of FIG. 3 connected in front. The characteristic curve filed for this purpose is selected such that, starting from a defined momentary engine power value, a pertaining minimum rotational speed of the fan 1 is demanded. Since the heating of the fluid friction coupling 2 is a function of the respective slip effect, an additional, slip-effect-representative rotational speed demand signal PS is fed to the maximal value selection stage 17. As a result, as a function of the momentary coupling temperature resulting from the slip effect, for limiting the heating of the coupling, a higher rotational fan speed can be demanded for lowering the coupling slip effect. All mentioned rotational speed demand signals are fed in parallel to the maximal value selection stage 17, which selects therefrom in each case the signal with the greatest demanded rotational speed as a rough desired rotational speed value $n_{Lsr}$.

Figure 5:
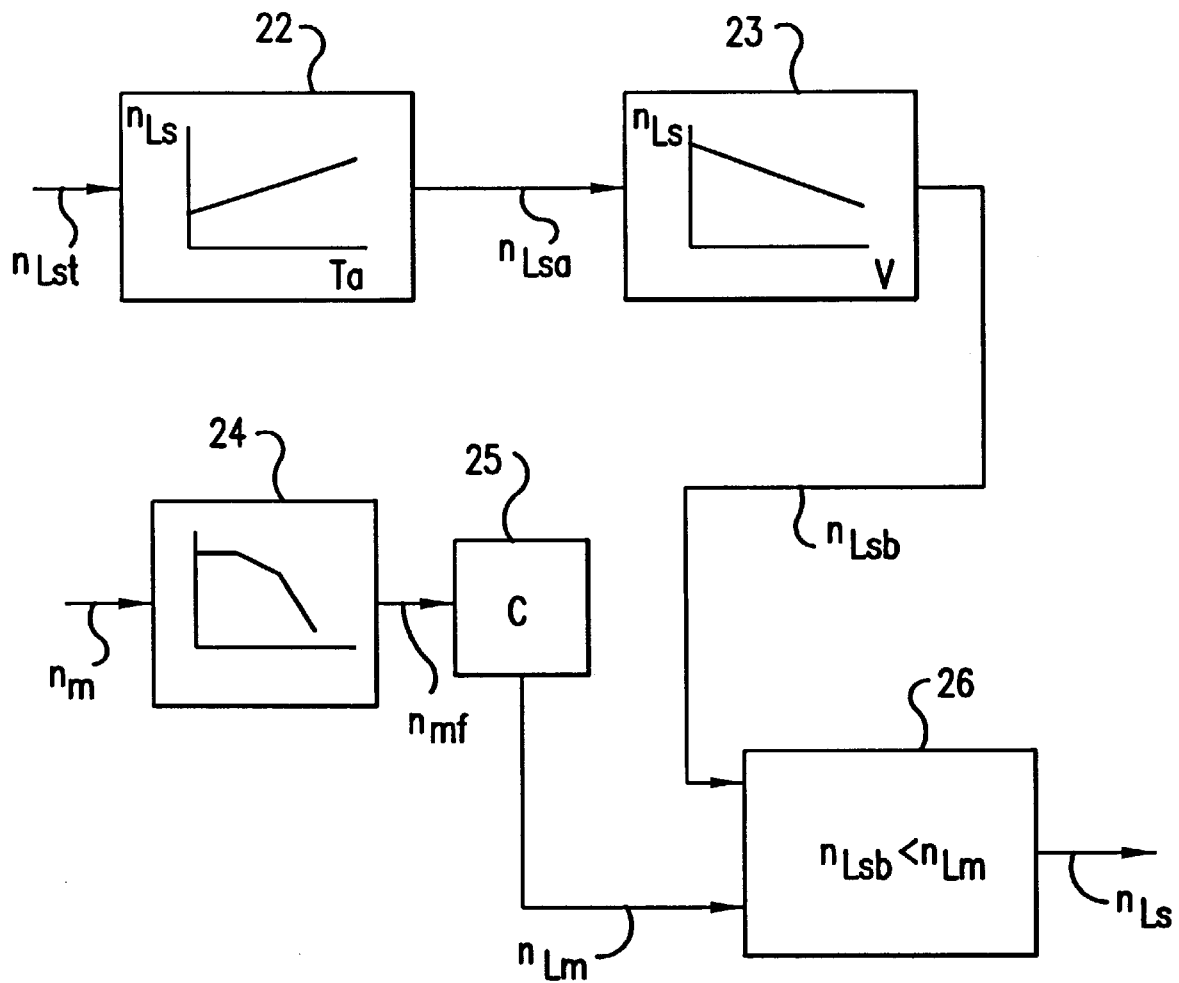
FIG. 5 is a block diagram of a correction controller part of the temperature controller stage in FIG. 1.

For the further improvement of the controller function, the temperature controller 4 contains another controller part illustrated in FIG. 5 through which different parameters can explicitly be taken into account that depend on changing environmental conditions. On the one hand, the outside temperature is sensed for this purpose and is taken into account in an outside temperature correction unit 22 of this controller part. Specifically, in this correction unit, the rough desired rotational speed value $n_{Lsr}$ emitted in the controller part of FIG. 4, connected in front by way of the maximal value selection stage 17, is corrected as a function of the outside temperature Ta into an outside-temperature-dependent rough desired rotational speed value $n_{Lsa}$. In an adjoining driving speed correction stage 23, the latter is corrected into a driving-speed corrected rough desired rotational speed value $N_{Lsb}$. In both correction stages 22, 23, suitable characteristic curves of the desired rotational fan speed $n_{Ls}$ are filed for this purpose as a function of the outside temperature Ta and of the driving speed v. These are selected such that a rising outside temperature, because of the smaller temperature gradient of the cooling outside air to the engine coolant, demands a higher rotational fan speed, while inversely a higher driving speed v, because of the then higher ram pressure in front of the cooler and the resulting higher air throughput, causes a lower rotational fan speed.

For stabilizing the rotational fan speed control, it is also expedient to limit the desired rotational fan speed value $n_{Ls}$ to the technically maximally possible rotational fan speed. This is defined by the rotational driving speed and the minimal coupling slip, which depends on the operating point of the fan in the case of a full connection (that is, a constantly opened valve and thus a maximally effective shearing fluid quantity). For this purpose, in the controller part of FIG. 5, the momentary rotational engine speed $n_M$ is guided via a low pass filter 24 by which short-term rotational speed changes are suppressed. Subsequent to this, the filtered rotational speed value nmf is multiplied with a constant c in a multiplier 25. As required, this constant c can also take into account a possibly existing rotational driving speed transmission ratio from the engine to the driving coupling disk. At the output of the multiplier 25, the information concerning the momentarily theoretically maximal rotational fan speed $n_{Lm}$ will then be available. In an output-side limiter stage 26, the desired rotational speed value $n_{Lsb}$, corrected with respect to environmental conditions, will then optionally be limited to this theoretically maximal desired rotational fan speed $n_{Lm}$. The limiter stage 26 will then emit the final desired rotational fan speed signal $n_{Ls}$ on the output side, which is supplied to the rotational fan speed controller 6.

Figure 6:
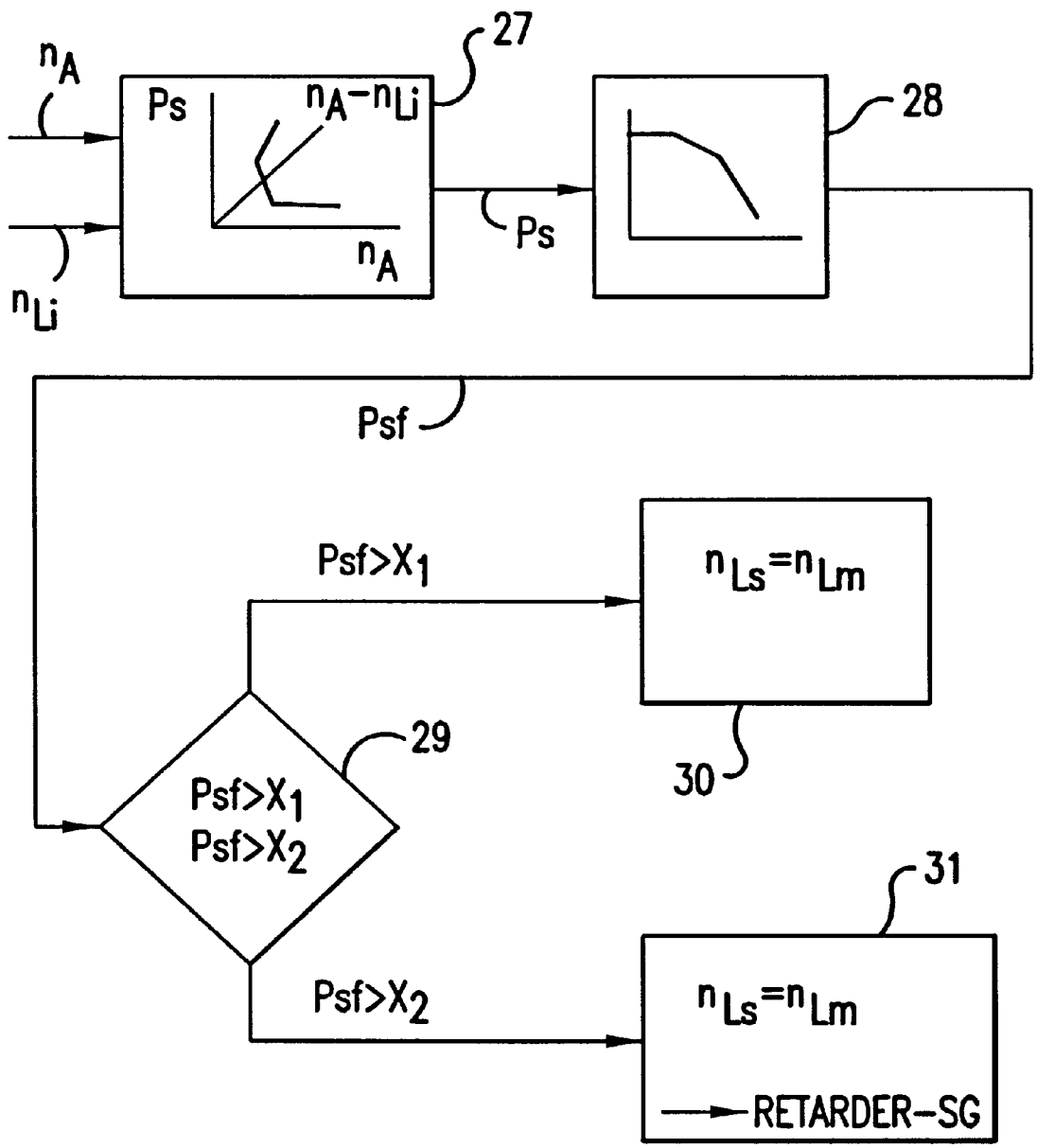
FIG. 6 is a block diagram of a controller part for determining the coupling temperature of the rotational speed controller stage in FIG. 1.

FIG. 6 illustrates a controller part of the rotational fan speed controller 6 which is used to implement monitoring of the coupling temperature. The maximal slip effect of the fluid friction coupling is achieved when the rotational fan speed $n_L$ amounts to approximately $\frac{2}{3}$ of the rotational driving speed $n_A$. The absolute slip effect amount rises with the rotational coupling level. The coupling 2 is normally dimensioned under economical aspects such that, in the range of high rotational driving speeds $n_A$, operating points with a high slip effect would (after a certain time) lead to an overheating of the coupling 2, which impairs its service life. It is therefore expedient to limit the dwell time of the coupling in such operating points and, by using a full coupling connection (which causes provision of the maximal fan cooling output), minimize the slip effect.

For this purpose, an empirically determined characteristic slip effect diagram of the coupling is first filed in a characteristic slip effect diagram stage 27 of the controller part of FIG. 6. The characteristic slip effect diagram indicates the slip effect $P_S$ as a function of the rotational driving speed $n_A$, as well as the difference between the rotational driving speed $n_A$ and the actual rotational fan speed $n_{Li}$. By feeding the momentary rotational driving speed $n_A$ and the actual rotational fan speed $n_{Li}$, the momentary slip effect $P_S$ is then determined in this characteristic diagram stage 27. The concerned slip effect signal $P_S$ is guided via a low pass filter 28 which integrates the time sequence of this signal such that the filtered slip effect quantity $P_{Sf}$ is a measurement of the actual coupling temperature. In a comparator stage 29, the filtered slip effect quantity $P_{Sf}$ is compared with two threshold values $X_1$, $X_2$ of different amounts.

If the filtered slip effect quantity $P_{Sf}$ exceeds the first lower threshold value $X_1$, this is assessed as the reaching of a first warning stage, which the controller part indicates via a first warning unit 30 using a corresponding warning signal.

Simultaneously, determination that the desired rotational fan speed value $n_{Ls}$ which, for a short time (because of the activated retarder), may possibly be above the theoretically maximal rotational fan speed $n_{Lm}$ (that is, limited to this theoretically maximal rotational speed value $n_{Lm}$) is initiated by the warning unit 30.

Should this measure no longer be sufficient for keeping the coupling temperature sufficiently low, and the filtered slip effect quantity $P_{Sf}$ therefore exceed the second higher threshold value $X_2$, this is assessed as a warning stage. A second warning unit 31, of the controller part of FIG. 6 in this case, emits a second warning signal characteristic of this warning stage. The second warning unit also limits the desired rotational fan speed $n_{Ls}$ to the theoretically maximally possible rotational fan speed $n_{Lm}$. Furthermore, according to the application, it carries out suitable interventions into the vehicle condition; for example, it controls a retarder control unit such that this control unit reduces the output from the retarder in order to counteract further development of heat.

Figure 7:
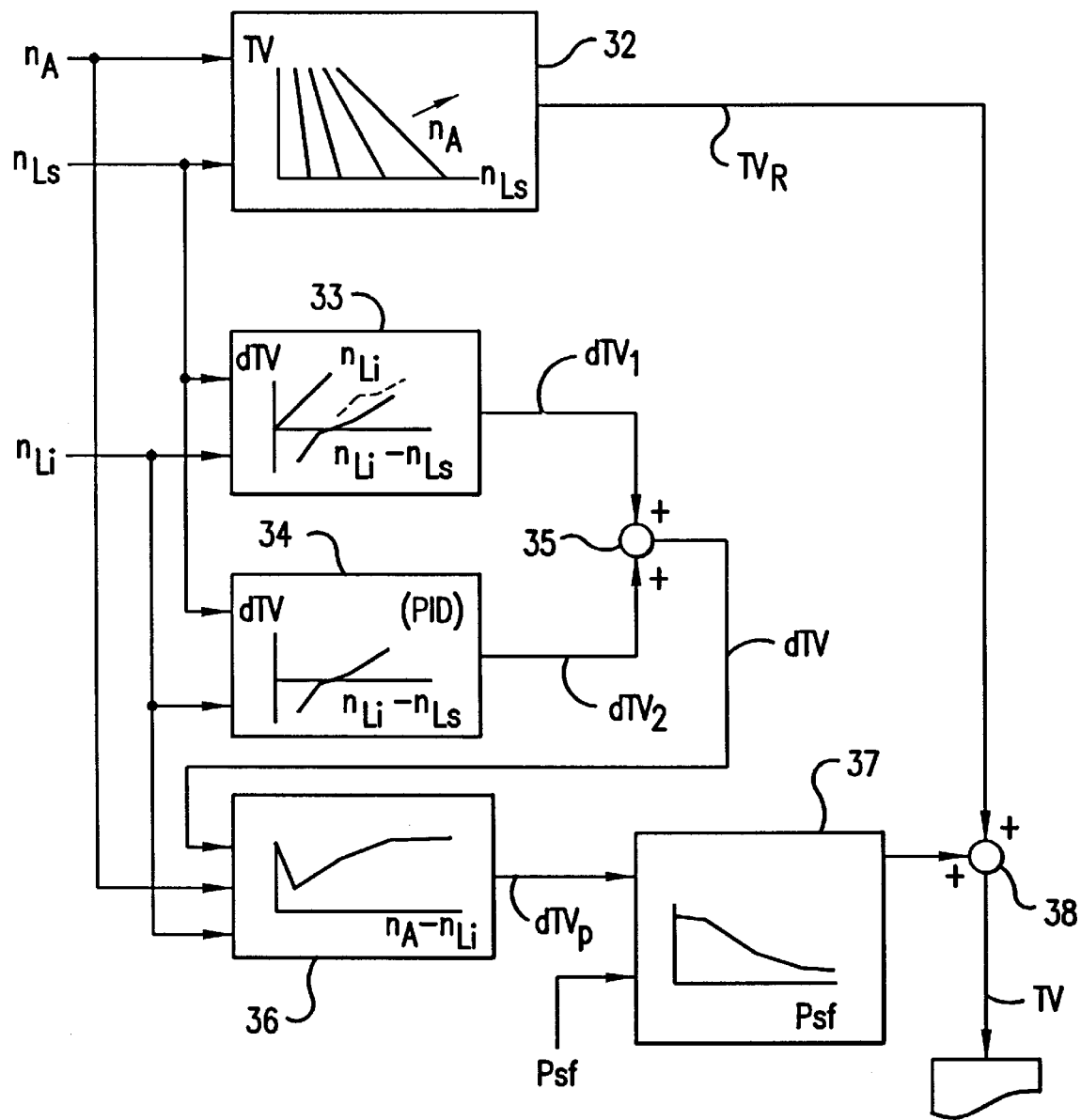
FIG. 7 is a block diagram of a controller part for generating the drive timing signal of the rotational speed control stage in FIG. 1.

The controller part of the rotational fan speed controller 6, illustrated in FIG. 7, is used for generating the drive timing signal TV for the solenoid of the coupling 2. For this purpose, it determines the relative opening time of the valve actuated by the solenoid; that is, the pulse width repetition rate $\tau/t_P$ for the drive timing signal TV as a function of the rotational driving speed $n_A$, the desired rotational far speed value $n_{Ls}$ supplied by the temperature controller 4 and the actual rotational fan speed $n_{Li}$. For this purpose, the rotational driving speed $n_A$ and the desired rotational fan speed $n_{Ls}$ are fed to a basic characteristic diagram stage 32. Here, a basic characteristic diagram for the drive timing signal TV, particularly for its pulse width repetition rate, is filed as a function of the rotational driving speed $n_A$ and the desired rotational fan speed $N_{Ls}$ of these two quantities such that, in the case of an ideal coupling, a corresponding actual rotational fan speed $n_{Li}$ is just reached. This basic characteristic diagram is experimentally determined beforehand for the respective application and stored. The basic characteristic diagram stage 32 emits a corresponding rough drive timing signal $TV_R$.

Since, as the result of the type of construction, real couplings can partially deviate significantly from the ideal behavior, the controller part of FIG. 7 has a corresponding correction part. This correction part contains a first controller unit 33 which determines a first correction value $dTV_1$ (as a function of the actual rotational fan Speed $n_{Li}$) and of the rotational fan speed control difference $n_{Li}$–$n_{Ls}$. For this purpose, the first controller unit 33 receives the actual rotational fan speed $N_{Li}$ and the desired rotational fan speed $n_{Ls}$. The characteristic controller diagram used in this controller unit 33 naturally represents a proportional characteristic, in which case the characteristic curve rise can be varied as a function of the actual rotational fan speed $N_{Li}$. This corresponds to the different response behavior of the coupling 2 in the case of different actual rotational fan speeds $N_{Li}$.

Optionally, a second controller unit 34 is provided which is parallel to the first. According to a PID control algorithm, the second controller unit 34 generates another pulse width repetition rate correction value $dTV_2$ as a function of the rotational fan speed control difference $N_{Li}$–$n_{Ls}$. For this purpose, the second controller unit 34 receives the actual rotational fan speed $N_{Li}$ and the desired rotational fan speed $n_{Ls}$. As the result of the integral part, this controller unit 34 can control a slight remaining control difference, while the D-part permits a fast reaction to correspondingly abrupt changes of the control difference. The two pulse width repetition rate correction values $dTV_1$, $dTV_2$ are added in an adder 35 to a total correction value dTV. This total correction value dTV is fed to an input of a pump correction stage 36 which, by way of additional inputs, receives the rotational driving speed $n_A$ and the actual rotational fan speed $n_L$. By means of this stage, in which a corresponding pump effect characteristic correction curve is filed, the characteristic of the internal pump which in the coupling 2 pumps the shearing fluid from the working space into the storage space is taken into account. In particular, the capacity of this pump is a function of the relative rotational speed between the rotational driving speed $n_A$ and the actual rotational fan speed $N_{Li}$, i.e., of the coupling slip.

The pump-corrected total correction value $dTV_p$ is fed to a coupling temperature correction stage 37. Connected and supplied to the coupling temperature correction stage is the filtered slip effect quantity $P_{Sf}$. In this correction stage 37, a characteristic curve is filed which takes into account the coupling temperature such that, at a higher coupling temperature, because of the then thinner shearing fluid, the coupling 2 will react faster. Here, the filtered slip effect quantity $P_{Sf}$ is used as the measurement for the coupling temperature. The pulse-width repetition rate end correction value $dTV_e$ obtained in this manner will then be added in an adder 38 to the rough drive timing signal $TV_R$ for generating the drive timing signal TV. This signal information is then converted by a power end stage (not shown in detail) to a corresponding voltage course for driving the solenoid in the coupling 2.

It was found that the described arrangement permits a very sensitive, precise and reliable rotational fan speed control for an engine fan that is optimally adapted to the different components to be cooled. It is understood that other interpretations of the rotational speed arrangement according to the invention can be implemented by a person skilled in the art. Here, in each case a rotational speed control circuit is subjacent to the temperature control circuit. Rotational speed control arrangements according to the invention are obviously not limited to the use for fluid friction couplings of engine fans, but can be used wherever a fluid friction coupling is applied and whose output-side rotational part is to be controlled with respect to its rotational speed. In the process, rotational speed control arrangements according to the invention have an effect which influences the temperature of one or several media.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving notational speed information ($n_A$), wherein the rotational speed controller stage, by way of an output signal (TV), drives the shearing fluid quantity adjusting unit, wherein the output rotational part is an engine fan coupled to a motor vehicle engine by way of the fluid friction coupling, the temperature information supplied to the temperature controller stage contains at least one engine-related actual temperature value ($KT_i$, $LT_i$, $MT_i$), and the temperature controller stage determines from a fed rotational engine speed information ($n_M$) and a fed engine torque information ($M_M$), the engine power ($P_M$) as a function of a characteristic diagram and determines therefrom as a function of the characteristic diagram, a desired temperature value ($KT_s$, $LT_s$, $M_s$) pertaining to the respective fed actual temperature value.

2. Rotational speed control arrangement according to claim 1, wherein the temperature controller stage contains several parallel rotational speed demand units, each of which is assigned to a corresponding input signal of the temperature controller stage and generates a rotational speed demand signal, and also contains a maximal-value selection stage to which the rotational speed demand signals are fed and which selects therefrom the signal with the greatest desired output rotational speed value as the desired output rotational speed information.

3. Rotational speed control arrangement according to claim 1, wherein the rotational speed controller stage determines from the fed rotational driving speed information ($n_A$) and the fed actual rotational output speed information ($n_{Li}$), via a filed characteristic slip effect diagram the time sequence of the coupling slip effect ($P_S$) and therefrom, via a low-pass filtering, generates a slip effect information ($P_{Sf}$) for monitoring the coupling temperature which is representative of the momentary coupling temperature.

4. Rotational speed control arrangement according to claim 3, wherein the output signal (TV) of the rotational speed controller stage is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

5. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$), wherein the rotational speed controller stage, by way of an output signal (TV), drives the shearing fluid quantity adjusting unit, wherein the temperature controller stage contains several parallel rotational speed demand units, each of which is assigned to a corresponding input signal of the temperature controller stage and generates a rotational speed demand signal, and also contains a maximal-value selection stage to which the rotational speed demand signals are fed and which selects therefrom the signal with the greatest desired output rotational speed value as the desired output rotational speed information.

6. Rotational speed control arrangement according to claim 5, wherein the rotational speed controller stage determines from the fed rotational driving speed information ($n_A$) and the fed actual rotational output speed information ($n_{Li}$), via a filed characteristic slip effect diagram the time sequence of the coupling slip effect ($P_S$) and therefrom, via a low-pass filtering, generates a slip effect information ($P_{Sf}$) for monitoring the coupling temperature which is representative of the momentary coupling temperature.

7. Rotational speed control arrangement according to claim 5, wherein the output signal (TV) of the rotational speed controller stage is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

8. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$), wherein the rotational speed controller stage, by way of an output signal (TV), drives the shearing fluid quantity adjusting unit, wherein the rotational speed controller stage determines from the fed rotational driving speed information ($n_A$) and the fed actual rotational output speed information ($n_{Li}$), via a filed characteristic slip effect diagram the time sequence of the coupling slip effect ($P_S$) and therefrom, via a low-pass filtering, generates a slip effect information ($P_{Sf}$) for monitoring the coupling temperature which is representative of the momentary coupling temperature.

9. Rotational speed control arrangement according to claim 8, wherein the output signal (TV) of the rotational speed controller stage 6 is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

10. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$), wherein the rotational speed controller stage, by way of an output signal (TV), drives the shearing fluid quantity adjusting unit, wherein the output signal (TV) of the rotational speed controller stage is formed as the sum of a basic adjusting signal (TVR) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

11. A control arrangement, comprising:

an output rotational part of a fluid friction coupling;

a driving rotational part coupled with said output rotational part by way of a sheering fluid whose effective fluid quantity determines a transferrable torque;

an adjusting unit for variably adjusting the effective shearing fluid quantity;

a temperature controller stage receiving temperature information ($T_K$, $T_L$, $T_R$) of at least one media whose temperature can be influenced by an output rotational speed ($n_{Li}$) of the output rotational part, and providing an output signal ($n_{Ls}$); and a rotational speed controller stage connected in cascade with the temperature controller stage and receiving the output signal ($n_{Ls}$), the output rotation speed ($n_{Li}$) and driving rotational speed information ($n_A$), and providing an output signal (TV);

wherein the rotational speed controller stage drives the adjusting unit to adjust the shearing fluid quantity via the output signal (TV);

wherein the output signal of the rotational speed controller stage is formed by a rectangular pulse drive timing signal (TV) with a variable pulse-width repetition rate ($t/t_p$) whose rectangular pulses are chomped into individual pulses at a freguency which is a function of the supply voltage for the adjusting unit;

wherein the output rotational part is an engine fan coupled to a motor vehicle engine by way of the fluid friction coupling, the temperature information supplied to the temperature controller stage contains at least one engine-related actual temperature value ($K_T$, $LT_i$, $MT_i$), and the temperature controller stage determines from a fed rotational engine speed information ($n_M$) and a fed engine torque information ($M_M$), the engine power ($P_M$) as a function of a characteristic diagram and determines therefrom as a function of the characteristic diagram, a desired temperature value ($KT_s$, $LT_s$, $MT_s$) pertaining to the respective fed actual temperature value.

12. The speed control arrangement according to claim 11, wherein the temperature controller stage contains several parallel rotational speed demand units, each of which is assigned to a corresponding input signal of the temperature controller stage and generates a rotational speed demand signal, and also contains a maximal-value selection stage to which the rotational speed demand signals are fed and which selects therefrom the signal with the greatest desired output rotational speed value as the desired output rotational speed information.

13. The speed control arrangement according to claim 12, wherein the rotational speed controller stage determines from a fed rotational driving speed information ($n_A$) and the fed actual rotational output speed information ($n_{Li}$), via a filed characteristic slip effect diagram, the time sequence of a coupling slip effect ($P_S$) and therefrom, via a low-pass filtering, generates a slip effect information ($P_{Sf}$) for monitoring the coupling temperature which is representative of the momentary coupling temperature.

14. The speed control arrangement according to claim 13, wherein the output signal (TV) of the rotational speed controller stage is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

15. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$).

wherein the rotational speed controller stage, by way of an output signal (TV), drives the shearing fluid quantity adjusting unit, wherein the output signal of the rotational speed controller stage is formed by a rectangular pulse drive timing signal (TV) with a variable pulse-width repetition rate ($t/t_p$) whose rectangular pulses are chopped into individual pulses at a frequency which is a function of the supply voltage for the shearing fluid quantity adjusting unit, wherein the output rotational part is an engine fan coupled to a motor vehicle engine by way of the fluid friction coupling, the temperature information supplied to the temperature controller stage contains at least one engine-related actual temperature value ($KT_i$, $LT_i$, $MT_i$), and the temperature controller stage determines from a fed rotational engine speed information ($n_M$) and a fed engine torque information ($M_M$), the engine power ($P_M$) as a function of a characteristic diagram and determines therefrom as a function of the characteristic diagram, a desired temperature value ($KT_s$, $LT_s$, $MT_s$) pertaining to the respective fed actual temperature value.

16. Rotational speed control arrangement according to claim 15, wherein the temperature controller stage contains several parallel rotational speed demand units, each of which is assigned to a corresponding input signal of the temperature controller stage and generates a rotational speed demand signal, and also contains a maximal-value selection stage to which the rotational speed demand signals are fed and which selects therefrom the signal with the greatest desired output rotational speed value as the desired output rotational speed information.

17. Rotational speed control arrangement according to claim 16, wherein the rotational speed controller stage determines from the fed rotational driving speed information ($n_A$) and the fed actual rotational output speed information ($n_{Li}$), via a filed characteristic slip effect diagram the time sequence of the coupling slip effect ($P_S$) and therefrom, via a low-pass filtering, generates a slip effect information ($P_{Sf}$) for monitoring the coupling temperature which is representative of the, momentary coupling temperature.

18. Rotational speed control arrangement according to claim 17, wherein the output signal (TV) of the rotational speed controller stage is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

19. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$), wherein the rotational speed controller stage, by way of an output signal (TV), drives the shearing fluid quantity adjusting unit, wherein the output signal of the rotational speed controller stage is formed by a rectangular pulse drive timing signal (TV) with a variable pulse-width repetition rate ($t/t_p$) whose rectangular pulses are chopped into individual pulses at a frequency which is a function of the supply voltage for the shearing fluid quantity adjusting unit, wherein the temperature controller stage contains several parallel rotational speed demand units, each of which is assigned to a corresponding input signal of the temperature controller stage and generates a rotational speed demand signal, and also contains a maximal-value selection stage to which the rotational speed demand signals are fed and which selects therefrom the signal with the greatest desired output rotational speed value as the desired output rotational speed information.

20. Rotational speed control arrangement according to claim 19, wherein the rotational speed controller stage determines from the fed rotational driving speed information ($n_A$) and the fed actual rotational output speed information ($n_{Li}$), via a filed characteristic slip effect diagram the time sequence of the coupling slip effect ($P_S$) and therefrom, via a low-pass filtering, generates a slip effect information ($P_{Sf}$) for monitoring the coupling temperature which is representative of the momentary coupling temperature.

21. Rotational speed control arrangement according to claim 20, wherein the output signal (TV) of the rotational speed controller stage is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

22. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$), wherein the rotational speed controller stage, by way of an output signal (TV), drives the shearing fluid quantity adjusting unit, wherein the output signal of the rotational speed controller stage is formed by a rectangular pulse drive timing signal (TV) with a variable pulse-width repetition rate ($t/t_p$) whose rectangular pulses are chopped into individual pulses at a frequency which is a function of the supply voltage for the shearing fluid quantity adjusting unit, wherein the rotational speed controller stage determines from the fed rotational driving speed information ($n_A$) and the fed actual rotational output speed information ($n_{Li}$), via a filed characteristic slip effect diagram the time sequence of the coupling slip effect ($P_S$) and therefrom, via a low-pass filtering, generates a slip effect information ($P_{Sf}$) for monitoring the coupling temperature which is representative of the momentary coupling temperature.

23. Rotational speed control arrangement according to claim 22, wherein the output signal (TV) of the rotational speed controller stage 6 is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

24. A rotational speed arrangement for controlling the rotational speed of an output rotational part of a fluid friction coupling which is coupled with a driving rotational part by way of a shearing fluid whose effective shearing fluid quantity determines the transferrable torque, the arrangement comprising:

a shearing fluid adjusting unit which can be electrically driven in a timed manner for variably adjusting the effective shearing fluid quantity;

a temperature controller stage which receives temperature information ($T_K$, $T_L$, $T_R$) of at least one media whose temperature can be influenced by the output rotational speed ($n_{Li}$); and a rotational speed controller stage connected in cascade with the temperature controller stage and to which the output signal ($n_{Ls}$) of the temperature controller stage is fed as the desired output rotational speed information, said rotational speed controller also receiving the actual output rotational speed information ($n_{Li}$) and the driving rotational speed information ($n_A$), wherein the rotational speed controller stage, by way of an output signal (TV), drives the shearing fluid quantity adjusting unit, wherein the output signal of the rotational speed controller stage is formed by a rectangular pulse drive timing signal (TV) with a variable pulse-width repetition rate ($t/t_p$) whose rectangular pulses are chopped into individual pulses at a frequency which is a function of the supply voltage for the shearing fluid quantity adjusting unit, wherein the output signal (TV) of the rotational speed controller stage is formed as the sum of a basic adjusting signal ($TV_R$) and of a correction adjusting signal ($dTV_e$), the rotational speed controller stage determining the basic adjusting signal as a function of the rotational driving speed ($n_A$) and of the desired rotational output speed ($n_{Ls}$) via a filed basic characteristic diagram, and determining the correction adjusting signal as a function of at least one of the rotational output speed control difference and at least one coupling operation condition quantity.

* * * * *

UNITED STATES PATENT AND TRADEMARK OFFICE
CERTIFICATE OF CORRECTION

PATENT NO. : 6,079,536
DATED : July 20, 2000
INVENTOR(S) : Werner Hummel et al.

It is certified that error appears in the above-indentified patent and that said Letters Patent is hereby corrected as shown below:

In Figure I

"Visor coupling" to "Visco coupling".

Signed and Sealed this

Twenty-fourth Day of April, 2001

Attest:

NICHOLAS P. GODICI

Attesting Officer     Acting Director of the United States Patent and Trademark Office